METHODS OF AND SYSTEMS FOR SPECTROCHEMICAL ANALYSIS

Filed Feb. 4, 1952 9 Sheets-Sheet 1

INVENTORS.
DAVID W. STEINHAUS
HENRY M. CROSSWHITE, JR.
BY
Woodcock and Phelan
ATTORNEYS

METHODS OF AND SYSTEMS FOR SPECTROCHEMICAL ANALYSIS

INVENTORS.
DAVID W. STEINHAUS
HENRY M. CROSSWHITE, JR.
BY
Woodcock and Phelan
ATTORNEYS

METHODS OF AND SYSTEMS FOR SPECTROCHEMICAL ANALYSIS

Filed Feb. 4, 1952 9 Sheets-Sheet 3

INVENTORS.
DAVID W. STEINHAUS
BY HENRY M. CROSSWHITE, JR.
Woodcock and Phelan
ATTORNEYS

METHODS OF AND SYSTEMS FOR SPECTROCHEMICAL ANALYSIS

Filed Feb. 4, 1952 9 Sheets-Sheet 4

INVENTORS.
DAVID W. STEINHAUS
HENRY M. CROSSWHITE, JR.
BY
Woodcock and Phelan
ATTORNEYS INVENTORS.
DAVID W. STEINHAUS
HENRY M. CROSSWHITE, JR.
BY
Woodcock and Phelan
ATTORNEYS INVENTORS.
DAVID W. STEINHAUS
HENRY M. CROSSWHITE, JR.
BY Woodcock and Phelan
ATTORNEYS

METHODS OF AND SYSTEMS FOR SPECTROCHEMICAL ANALYSIS

INVENTORS.
DAVID W. STEINHAUS
HENRY M. CROSSWHITE, JR.
BY Woodcock and Phelan
ATTORNEYS

METHODS OF AND SYSTEMS FOR SPECTROCHEMICAL ANALYSIS

Filed Feb. 4, 1952 9 Sheets-Sheet 8

INVENTORS.
DAVIS W. STEINHAUS
HENRY M. CROSSWHITE, JR.
BY
Woodcock and Phelan
ATTORNEYS

METHODS OF AND SYSTEMS FOR SPECTROCHEMICAL ANALYSIS

Filed Feb. 4, 1952 9 Sheets-Sheet 9

INVENTORS.
DAVID W. STEINHAUS
HENRY M. CROSSWHITE, JR.
BY
Woodcock and Phelan
ATTORNEYS

United States Patent Office 2,744,438

Patented May 8, 1956

2,744,438

METHODS OF AND SYSTEMS FOR SPECTROCHEMICAL ANALYSIS

David W. Steinhaus and Henry M. Crosswhite, Jr., Baltimore, Md., assignors to Leeds and Northrup Company, Philadelphia, Pa., a corporation of Pennsylvania Application February 4, 1952, Serial No. 269,742

22 Claims. (Cl. 88—14)

This invention relates to spectrochemical analysis and particularly to methods and systems for quantitative determination of the percentage composition of various materials, particularly specimens of alloy melts.

In accordance with one aspect of the present invention, the specimen is periodically excited by spark discharges and the spectrographic system is periodically activated for response after a brief time during the earlier part of the interval between initiation of the successive sparks. Within such brief time, of the order of a few microseconds, the air lines subside to negligible value so that the spectrum for the remainder of the interval is free of their obscuring effect upon the spectral lines of the specimen.

More particularly and in accordance with one aspect of the invention, the activation of the spectrograph system is delayed for a further brief time in the sparking cycle until the spark current is of zero or negligible value. Since the spark lines and continuous background practically disappear within a fraction of a microsecond after cessation of the spark current, it is thus provided that the spectrum, as recorded, includes only the arc lines, which lines persist for as much as one hundred microseconds after termination of the spark current, to the substantial exclusion of air lines, background and spark lines. By selection of such subsequent interval for responsiveness of the spectrograph system, there is attained both the sensitivity of an arc source and the reproducibility of a spark source without the instabilities of an arc.

Further in accordance with the invention, the activation of the spectrograph within the sparking cycle is effected by an electric gating signal initiated by radiation from the spark. More specifically, in the direct-reading type of spectrograph utilizing a phototube, phototube amplifier and recorder arrangement, the gating signal controls an electronic switch for the phototube or its amplifier. Both the time of initiation and duration of the period of responsiveness are preferably adjustable for selection of the interval which affords in the resulting signal the best ratio of the desired information to the continuous background inherently present during the sparking interval.

More generally in accordance with the invention, the period of responsiveness of the spectrograph within the sparking interval may be shifted to sample the radiation for different selected portions of the interval. Thus, by setting the spectrograph to pass radiation only within a narrow wavelength band and slowly shifting the time of initiation of the response period for successive sparking cycles, the resultant record is of the spectral intensity in that region as a function of time. Reliable quantitative spectral information is thus obtainable from signals which as a result of the integrated effect of many cycles are of the order of 1000 times weaker than those useful oscillographically. This may be done in a particular record for arc lines, spark lines, continuous background, or various constituent elements of a specimen and in whatever part of the spectrum is of interest for the particular analysis. By a series of such records at different wavelengths, the spectral intensities may be mapped with tri-dimensional coordinates as a function of wavelength and of time within the sparking cycle. Alternatively, the spectrum may be repeatedly scanned in wavelength with a time interval which is fixed for each scanning but which is shifted in the time coordinate for successive scannings to produce a series of records of wavelength versus intensity from which intensity may be plotted against time in bi-dimensional coordinates or against wavelength and time in tri-dimensional coordinates.

The invention further resides in spectrographic methods and systems having features of novelty and utility hereinafter described and claimed.

For a more detailed understanding of the invention and for illustration of methods and systems embodying it, reference is made to the accompanying drawings, in which.

Figure 1:
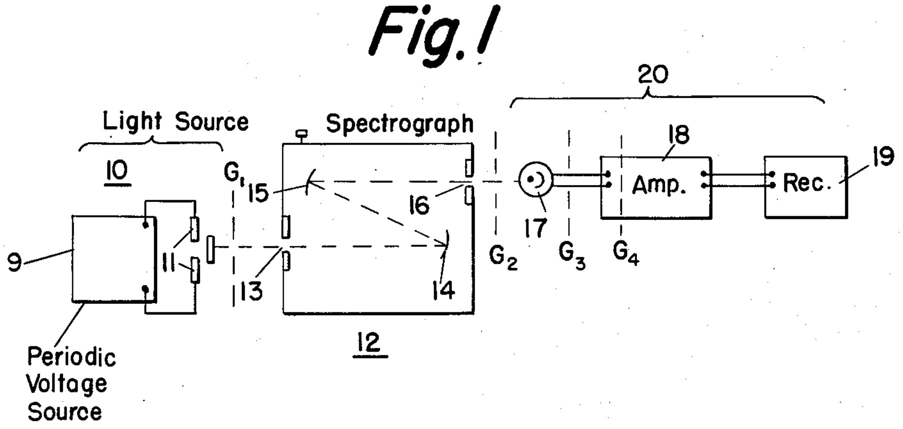
Fig. 1 is a block diagram of a direct-reading spectrograph system.
Figure 5:
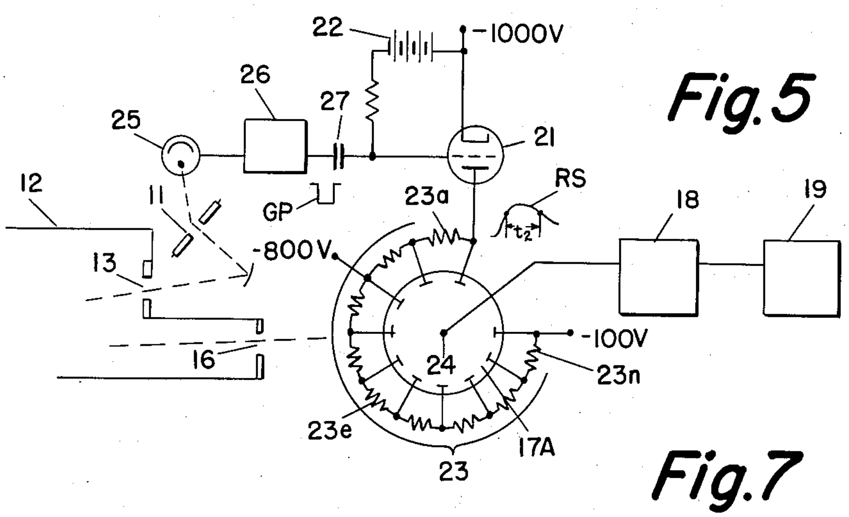
Figure 6:
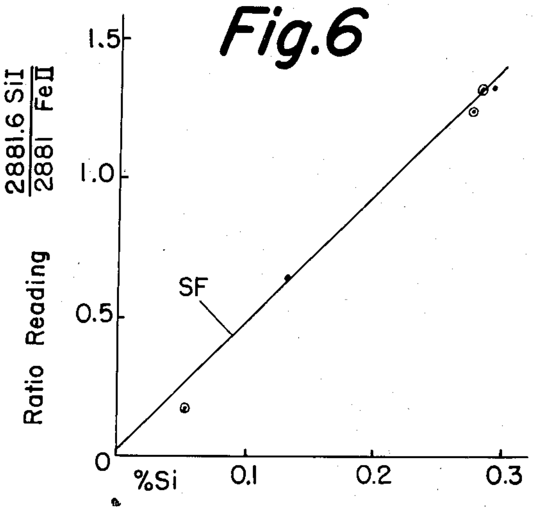
Figure 7:
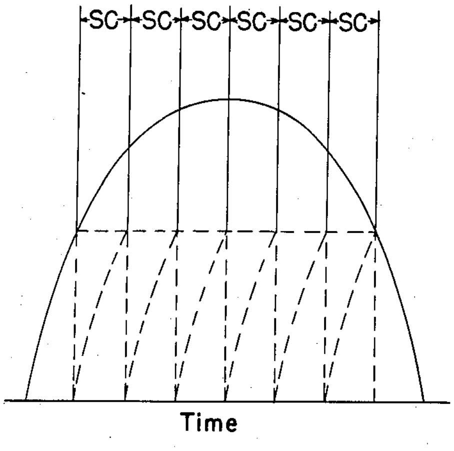
Figure 8:
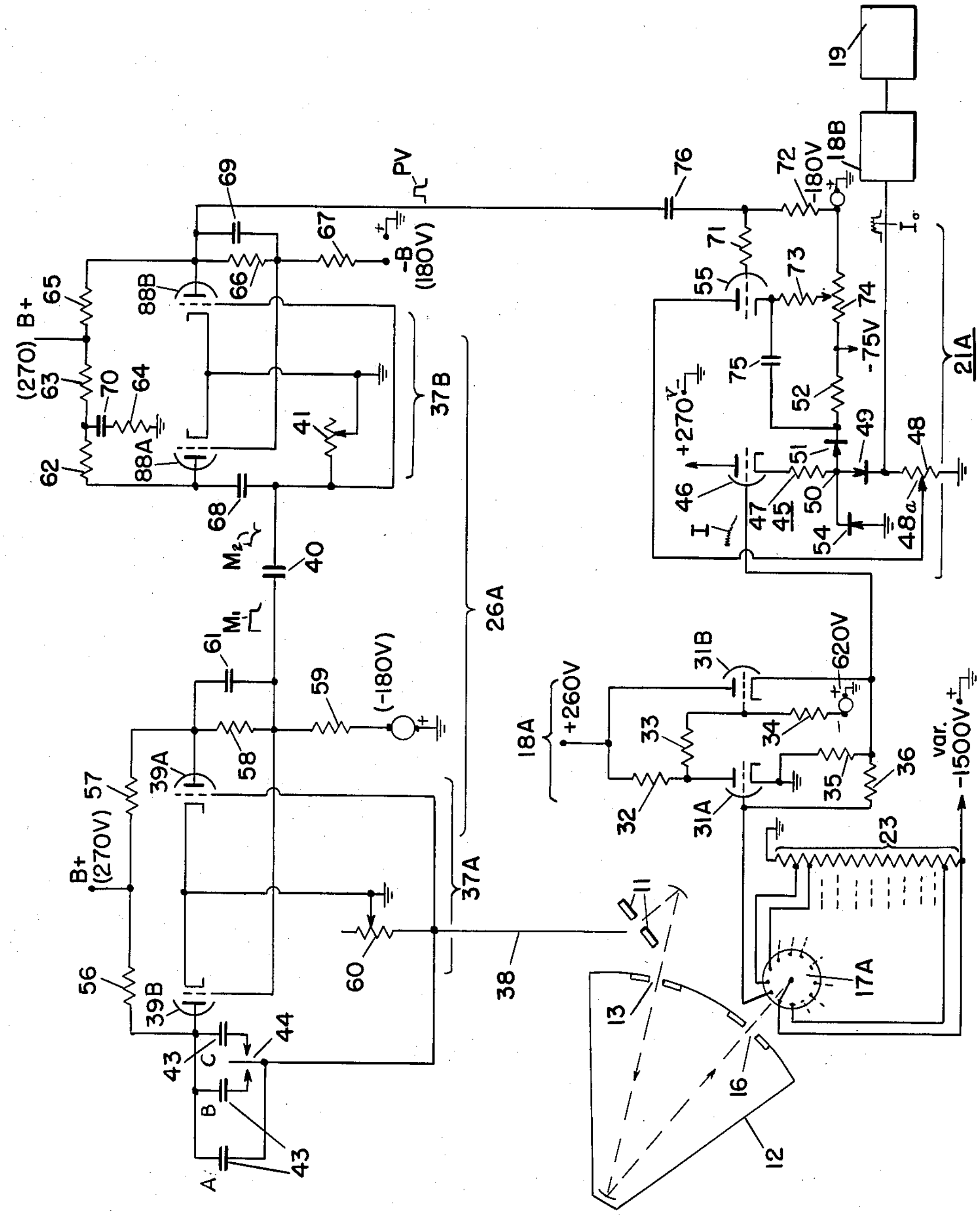
Figure 11:
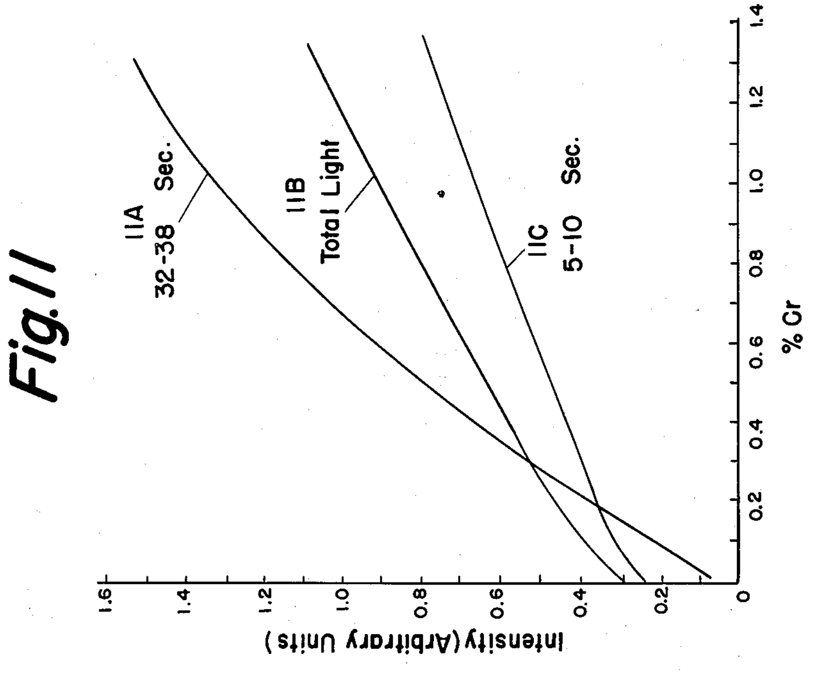
Figure 10:
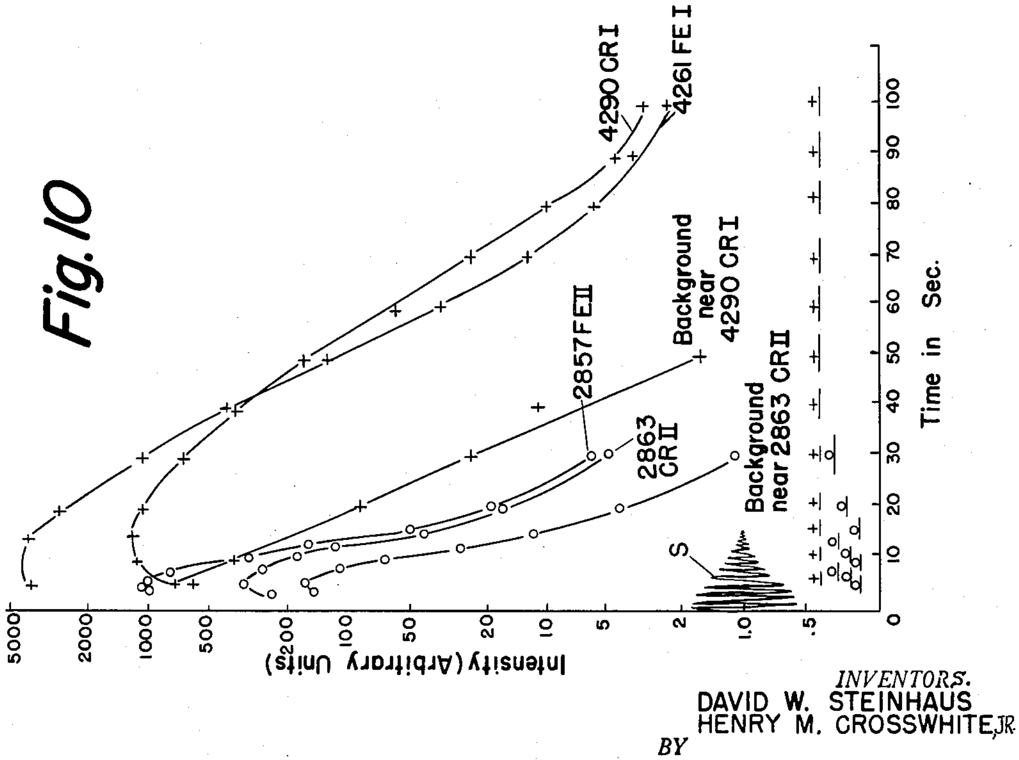
Figure 16:
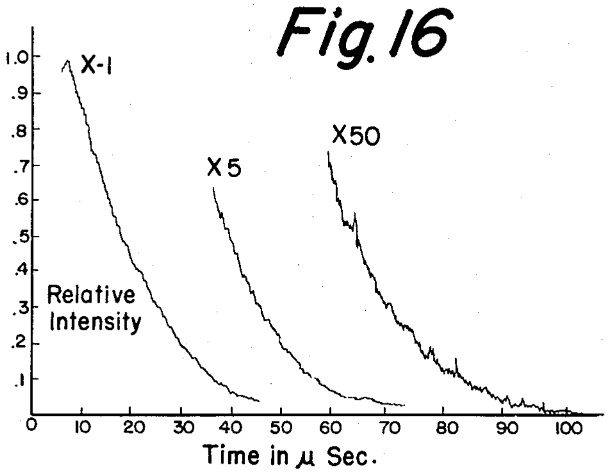
Figures 13A, 13B, 13C, 13D, 13E:
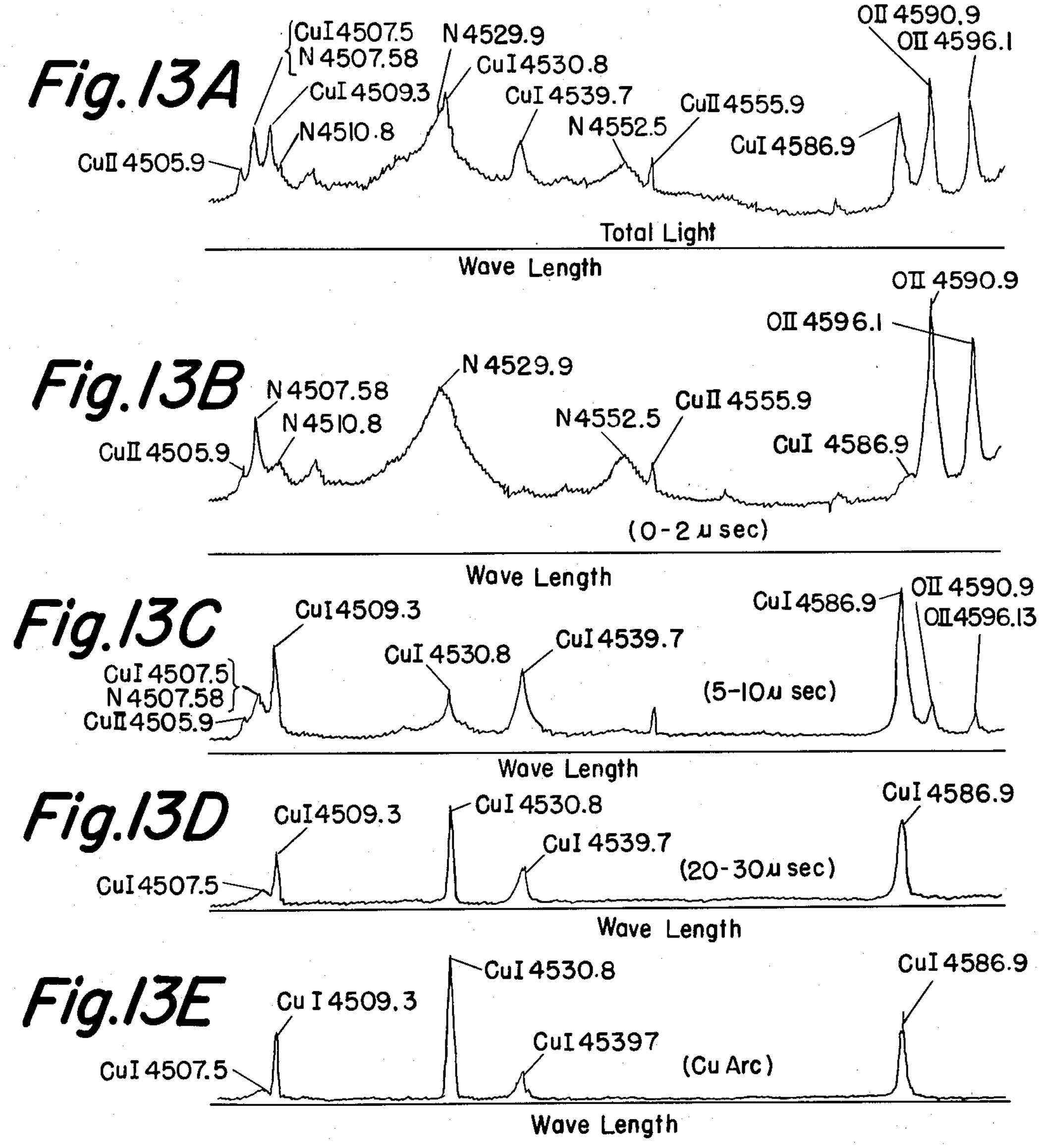
Figure 14A:
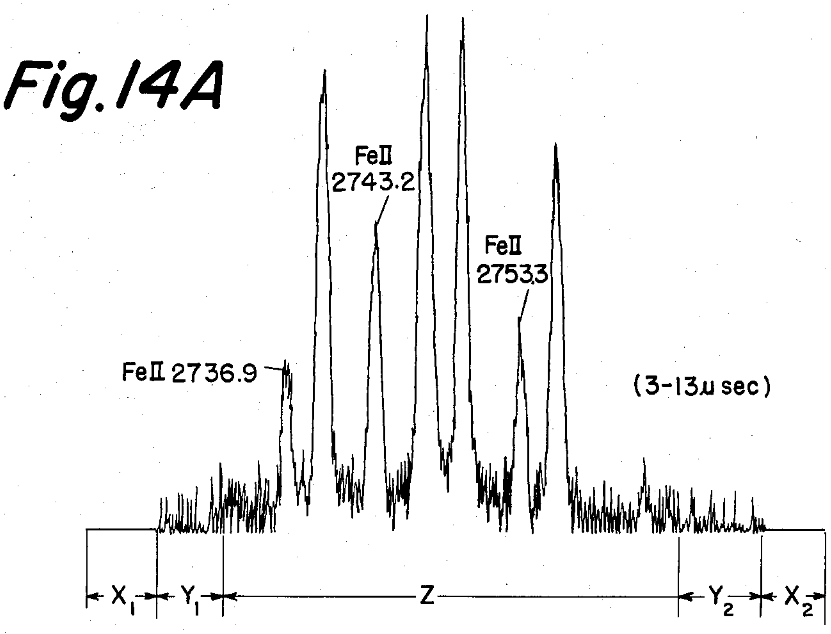
Figure 14B:
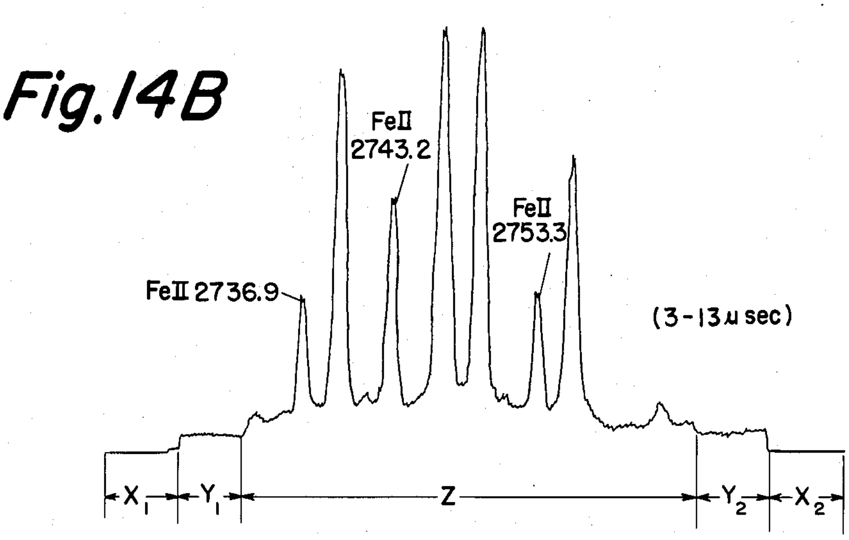
Figure 15:
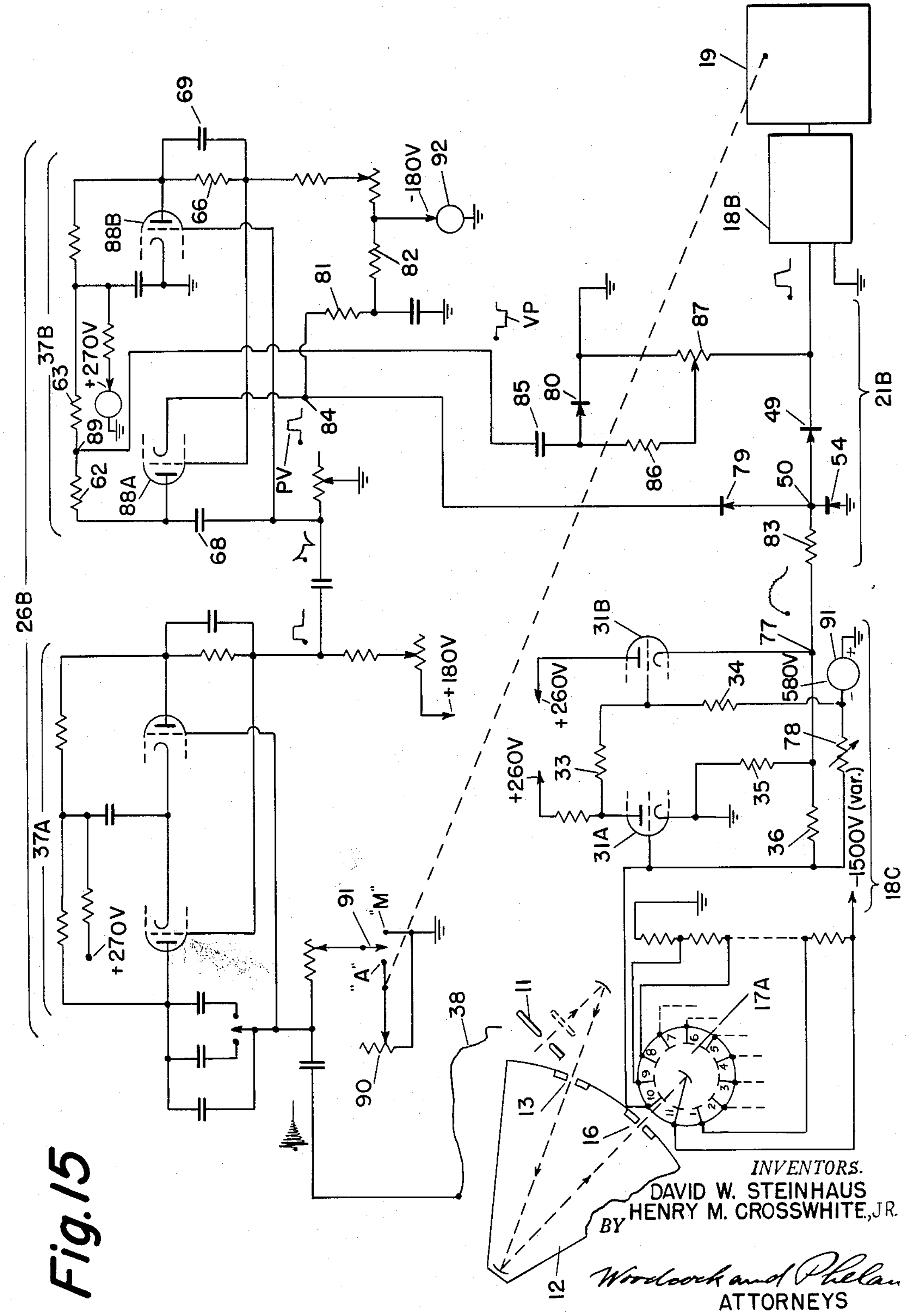

Fig. 5 schematically shows an electronic gate for the phototube of a direct-reading spectrograph;

Fig. 6 is a working curve discussed in connection with Fig. 5;

Fig. 7 is an explanatory figure referred to in discussion of the sparking interval;

Fig. 8 schematically illustrates a modification of the gating arrangement of Fig. 5;

Figs. 9A–9E are explanatory figures referred to in discussion of Fig. 8;

Fig. 10 shows time-intensity curves of components of the radiation from an analytical sample;

Fig. 11 shows analytical working curves for different sampling periods;

Figs. 12A–12D are records of spectral emission from a sample during different periods of the sparking interval;

Figs. 13A–13D are records of spectral emission from another sample during different periods of the sparking interval;

Fig. 13E is an arc-analysis record of the sample of Figs. 13A–13D;

Figs. 14A, 14B show spectral records obtained respectively without and with an electronic gate;

Fig. 15 is a further improved modification of the arrangements shown in Figs. 1, 5 and 8; and Fig. 16 is a time-intensity record in which the gain of the gated amplifier is stepped to different values during the spectral analysis.

In general, a spectrograph system used in spectrochemical analysis comprises a light source providing for emission of radiation by a specimen of material to be analyzed, a spectroscope having a diffraction grating or prism which produces a spectrum of the radiation received from the light source, and a radiation-sensitive detector which converts the output of the spectrograph to an electrical signal which is recorded.

For the purposes of this invention, the light source 10, Fig. 1, is a spark-source comprising a pair of electrodes 11, 11 connected to a source of high voltage 9 which at selected repetition rate breaks down the analytical gap between the electrodes. As exemplary of suitable and preferred light sources, reference is made to United States Letters Patent Nos. 2,456,116 and 2,541,877. For spectrochemical analysis of a metal, or other conductor, specimens thereof are utilized as the electrodes 11, the metallic vapors produced by the discharge having characteristic wavelengths of emission and absorption.

The spectroscope 12, having an entrance slit 13 disposed to receive radiation from the light source 10, may be of any suitable type: preferred types are disclosed in U. S. Letters Patent 2,572,119 and 2,734,418 and in copending application Serial No. 241,188. The optical system of the spectroscope shown in the simple schematic of Fig. 1 includes a collimating mirror 14 and a diffraction grating 15 (or equivalent spectrum producing means) which can be angularly adjusted to select the wavelength or narrow band of wavelengths of the spectrum which is permitted to pass the exit slit 16.

In the direct-reading type of system shown in Fig. 1, the spectral radiation selectively passed by spectroscope 12 is applied to a photocell 17 whose electrical output after amplification by amplifier 18 is recorded by a moving chart recorder 19. The photocell 17, amplifier 18 and recorder 19 comprise a direct-reading radiation-detector system 20: suitable systems of this type are disclosed in patents including Nos. 2,522,976, 2,547,105, and 2,638,811.

Figure 2A:
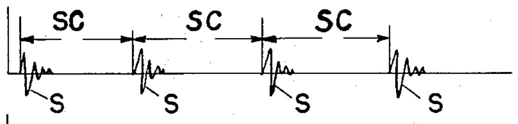
Figs. 2A–2F are explanatory figures referred to in discussion of the invention.

As indicated in Figs. 2A and 10, the spark current is a damped oscillatory discharge S which rapidly drops to negligible magnitude within the sparking cycle SC. By way of example, the spark current usually is of negligible value within fifteen or twenty microseconds and the repetition rate of the sparking cycle is within the range of from about 60 to 1200 sparks per second. Arrangements for varying the number of sparking cycles SC per half-wave of the supply voltage (Fig. 7) are disclosed in aforesaid Letters Patent 2,456,116.

Figures 3A, 3B, 3C, 4A, 4B, 4C, 4D, 4E:
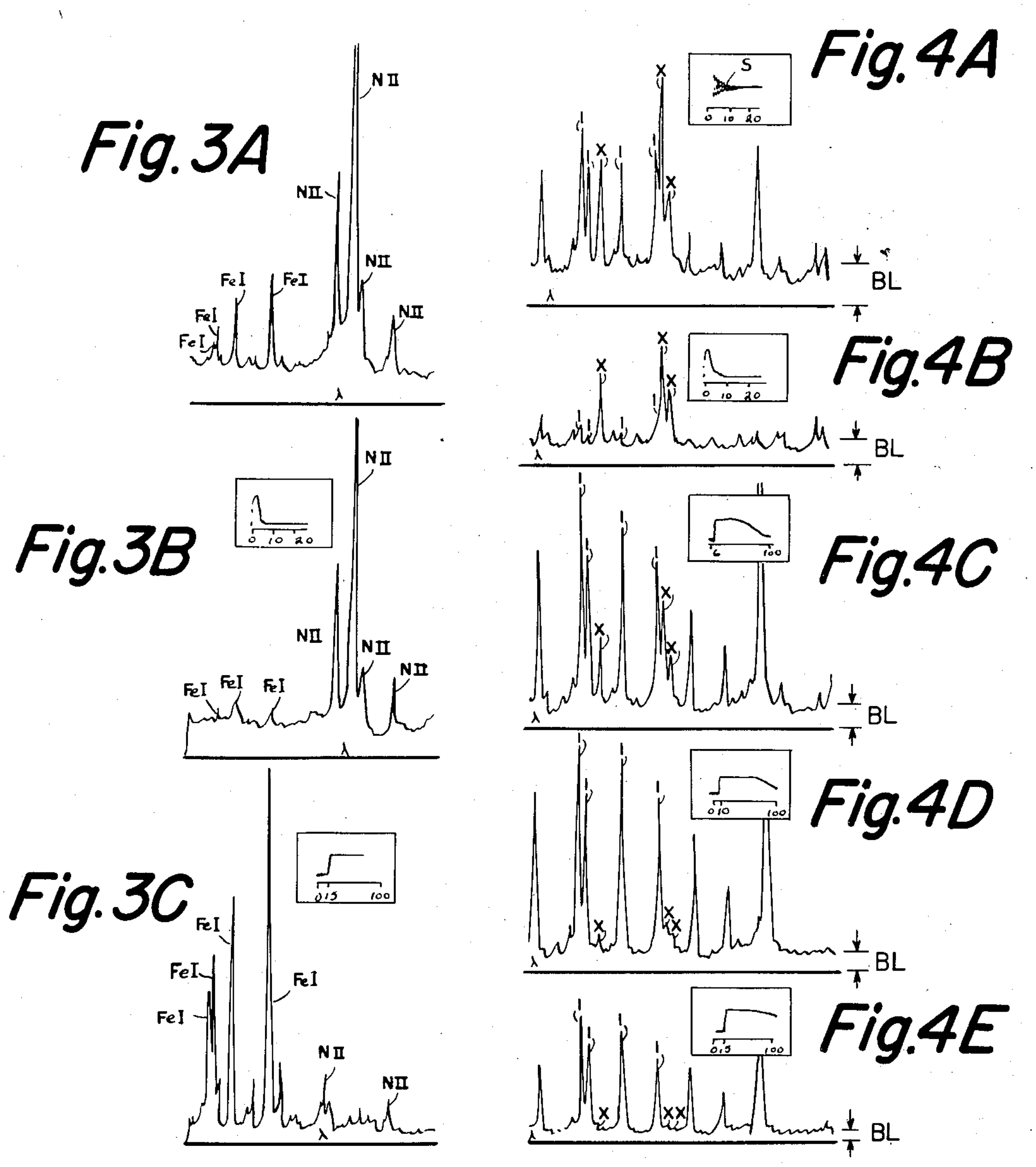
Figs. 3A–3C are explanatory figures referred to in discussion of selective suppression of air lines.
Figs. 4A–4E are explanatory figures referred to in discussion of selected suppression of arc or spark lines.

Heretofore in spark analysis, the recording by photographic film or by a chart recorder has proceeded continuously throughout the successive sparking cycles. The spectral record so produced is very complex because it includes air lines, continuous background, spark lines and arc lines making quantitative determination, particularly of weak arc lines, most difficult. By way of example, Fig. 3A shows a section of the iron spark spectrum in the green: the group of four strong lines on the right half are air lines (nitrogen spark lines), specifically lines 5666.64, 5679.56, 5686.21 and 5710 A. (Angstroms); the four strongest lines on the left half are iron arc lines Fe I 5569.62, 5572.85, 5586.76 and 5615.65 A.

Figure 2B:
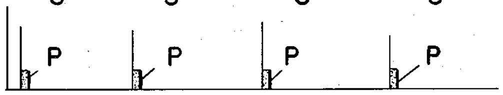

When, however, as indicated by response periods P of Fig. 2B, the sensitivity of the system is high only for the first few microseconds of each sparking interval SC, the iron lines nearly disappear but the air lines remain full strength (Fig. 3B): conversely, when the sensitivity or response is high only after the first few microseconds of each sparking interval, as indicated by the response periods $P_1$ (Fig. 2C), the iron lines are of high intensity but the air lines have nearly disappeared despite the higher amplifier gain used in obtaining the trace (Fig. 3C).

Figs. 4A to 4E show a portion of the iron spark spectra near 3100 A., and illustrate the relative behavior of the arc Fe I and spark Fe II lines, respectively marked I and X as observed first in accord with prior practice and then in accord with the present invention. When, as shown in Fig. 4A and in accord with prior practice the sensitivity is constant throughout the successive sparking intervals, the arc and spark lines are of comparable intensities: the strongest Fe I line is at 3057.45 A. and the strongest arc lines at 3077.17 A. When, however, as in Fig. 2B the system sensitivity is high only for the first few microseconds of each sparking interval, the arc lines I are inconsequential compared to the spark lines X, as shown in Fig. 4B. When, however, generally as in Fig. 2C the sensitivity is high only after the first few microseconds, the arc lines I are very prominent (Figs. 4C–4E): as shown by comparison of Figs. 4C, 4D, 4E, the gain in intensity of the arc lines relative to the spark lines increases with increasing delay of initiation of the response period within the sparking period. The small inserts in Figs. 4B–4E show the sensitivity of the spectrometer system as a function of time respectively for the records of those figures. When the delay is about 15 microseconds, the spark lines X have essentially disappeared (Fig. 4E). It is also to be noted the background level BL has weakened very considerably.

By delaying the response until after the initial portion of the sparking period, the resultant spectrum, as indicated by Figs. 3C, 4C–4E, consists almost exclusively of Fe I lines and has therefore the desirable characteristics of an arc spectrum despite the fact that the source is not an arc source and that no current is flowing to the electrodes for at least the predominant part of the response period. By this method, the sensitivity of the arc method of spectrochemical analysis is combined with the reproducibility of the spark method.

In practice of this improved method of spectrochemical analysis, response only during selected periods of the sparking cycle may be effected by operating an electronic gate at a suitable point, such as points $G_3$, $G_4$ (Fig. 1) to control the electrical spectral signal as transmitted from the photocell 17, its amplifier 18 or the recorder 19.

The arrangement shown in Fig. 5, a specific embodiment of Fig. 1, provides periodic activation of a direct-reading spectrograph by electronically controlling the sensitivity of a photomultiplier tube 17A, for example a 1P28 tube, which receives the spectral energy passed by the exit slit 16 of the spectroscope 12. The gating is therefore effected at location $G_3$ of Fig. 1. The dynode circuit of tube 17A (Fig. 5) includes, in series with source of dynode voltage and the potential-dividing resistors **23*a*—23*n*, a tube 21, such as 6SN7, which is normally biased beyond cut-off by a suitable source of grid-biasing voltage exemplified by battery 22. Thus, the first two dynodes of tube 17A are normally at substantially the same potential as the cathode 24 which is sufficient to reduce the output signal to less than $1/200$ of its normal value. In effect, tube 21 is a switch which is normally "off" to provide greatly depressed sensitivity of the photo-responsive tube 17A** of the spectrograph system.

To close such switch for a desired period within each sparking cycle, there is provided, in this modification, a second photocell 25, also preferably a photomultiplier tube, which receives radiation from the analytical gap between electrodes 11, 11 of the light source. The output current of phototube 25 which rises very fast is used to trigger a one-shot multivibrator 26 which generates a square-wave gating pulse GP of selected duration. As such multivibrators and arrangements providing for adjustment of duration of their pulse length are per se well known, further description thereof is here unnecessary.

Figure 2C:
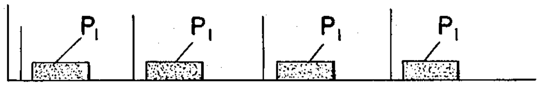
Figure 2D:
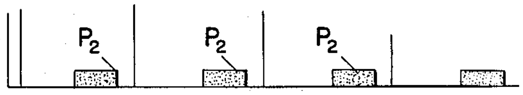
Figure 2E:
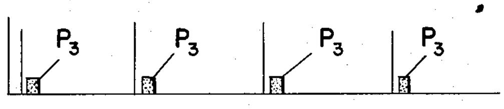
Figure 2F:
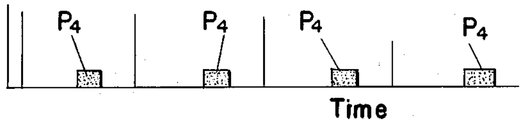

The delayed trailing edge of pulse GP, as applied through capacitor 27 of switching tube 21, is effective to turn it "on" for application to the tube 17A of normal dynode voltage for a period $t_2$ corresponding with the selected duration of pulse $P_1$, Fig. 2C. In brief, the length of the multivibrator pulse GP determines the time elapsing between the beginning of a sparking interval SC and initiation of the period $P_1$ of normal sensitivity of photomultiplier tube 17A: the decay of potential from capacitor 27 essentially determines the time interval $t_2$ for which tube 17A retains normal sensitivity within the sparking interval. Because each individual spark triggers the gating signal generator comprising tube 25 and multivibrator 26, it is not essential that the repetition frequency of the spark remain strictly constant throughout an analysis.

The curves of Figs. 3A–3C and Figs. 4A–4E, above discussed, were obtained by measurement of the output current of tube 17A, Fig. 5, by an amplifier recorder-arrangement, generally such as shown in Patent No. 2,367,746 — Williams. The time between successive sparks is small compared to the time constant of the recorder so that each point of the trace is an average over many individual sparking intervals: i. e., the recorded intensity of each point is the integrated response divided by time. The small block insert of Fig. 4A shows the waveform of the spark-discharge current as generated by a pick-up coil (not shown) in the source unit 10: the small block inserts of Figs. 3B, 3C and 4B to 4E show the waveform of the phototube amplifier sensitivity, as controlled by the gate.

Figure 12A:
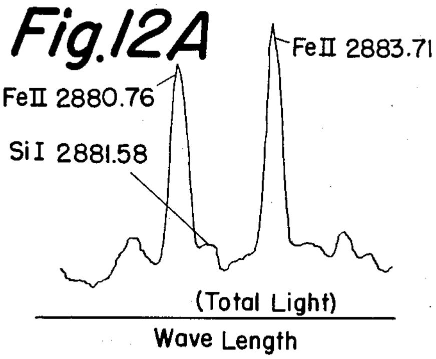

As illustrative of applicability of the system of Fig. 5 for spectrochemical analysis, the problem of the determination of silicon in steel was chosen. For small percentages of silicon, the 2881.58 arc line is most suitable but it could not heretofore be satisfactorily used because of severe interference by the strong Fe II spark line at 2880.76 A. and the Cr II line at 2881.93 A. (Fig. 12A). By depressing, as hereinabove explained, the sensitivity for a few microseconds at the beginning of the sparking intervals, such interference may be very materially reduced so that as shown by working curve SF, Fig. 6, the Fe II line may be used as an internal standard for spectrochemical determination of silicon concentrations below 0.3%. With the same equipment and conditions but with omission of the gating, silicon concentrations of less than 0.3% could not be determined spectrochemically. This working curve was plotted from spectrochemical measurements upon specimens, each of whose silicon-iron ratios was determined or checked by a so-called "wet" analysis which is a relatively slow non-spectrographic method. As there is very close agreement of the two sets of measurement, the working curve SF can be relied upon for accurate determination of silicon by the spectrochemical methods herein described.

Theoretically, the gating signal could be used to control a mechanical shutter or a Kerr cell shutter at either of the locations $G_1$, $G_2$ of Fig. 1. However, neither of such arrangements is practical; a mechanical shutter is too slow and its inertia precludes attainment of the rapid and precise timing essential to the invention; a Kerr cell shutter though fast requires excessively high voltages and, what is more important, is inherently insensitive because even under optimum conditions it transmits only about 5% of the light. The Kerr cell itself has a theoretical maximum transmission of 50%, the remaining attenuation being due to associated shutter components such as polarizer, analyzer.

With the simple gating arrangement of Fig. 5, the sensitivity of phototube 17A sharply rises at the beginning of each response period $P_1$ (Fig. 2B) but declines gradually during the period as generally shown by the waveform in the small block inserts of Figs. 3B, 4B to 4E. This is satisfactory for many purposes provided the sensitivity subsides to negligible value before occurrence of the next spark. It is more desirable, as obtainable with the arrangement shown in Fig. 8 that the sensitivity or response of the system be of sharply defined square-wave shape whose duration as well as time of initiation may be precisely predetermined for sampling of the radiation for a period beginning at any time in the sparking interval SC and of any desired duration within that interval as generally shown by periods P—$P_4$ of Figs. 2B–2F.

Figure 12B:
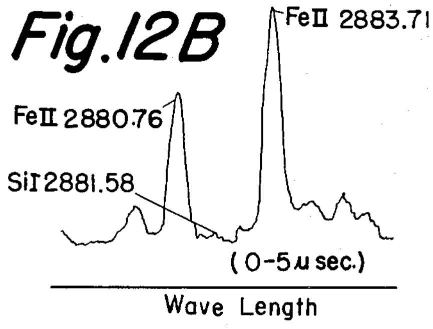
Figure 12C:
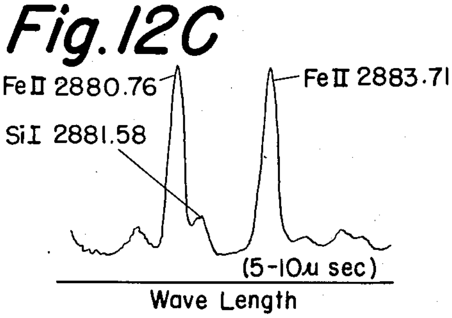
Figure 12D:
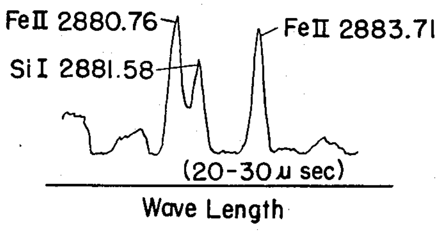

As illustrative of the significant advantage of selection of the time of initiation and duration of the sampling period, reference is made to Figs. 12A to 12D. As above stated, for determination of small percentages of silicon in steel, the 2881.58 A. Si arc line is most suitable, but as shown in Fig. 12A this line could not heretofore be satisfactorily used because when the spectrograph is responsive throughout the sparking interval, there is severe masking or interference from strong iron spark lines at the adjacent wavelengths 2880.76 A. and 2883.71 A. As shown by Figs. 12B, 12C and 12D, when the present method is employed and as the sampling interval is increasingly delayed, the desired silicon line becomes more pronounced and by using a 10 microsecond interval —delayed for 20 microseconds—both the silicon and iron lines are well resolved so that low percentage of silicon can be accurately determined with either of the adjacent iron lines as an internal standard.

Also as illustrative of the advantage of selection of the time of initiation and duration of the sampling period, reference is made to Figs. 13A to 13E. When, as shown in Fig. 13A, the light for the entire sparking interval is used in investigation of copper spectra between about 4500 A. to 4600 A., the record is characterized by high background level, by air lines (nitrogen and oxygen lines) and by both arc and spark lines of copper. Moreover, the resolution of the copper arc lines 4509.338 A. and 4530.819 A. is poor as compared with that obtained by a continuous arc analysis (Fig. 13E). As shown by Fig. 13B, with the sampling interval set for 0 to 2 microseconds, the resulting record shows that much of the high level background of Fig. 13A is due to the radiation emitted during that brief initial period: it also shows that the air lines of Fig. 13A are very strong for the 0–2 microsecond period of the sparking interval. As shown by Fig. 13C, the record of the copper arc lines is improved when the sampling period is from 5 to 10 microseconds as compared to Fig. 13A, but the copper spark lines and oxygen lines still appear in attenuated form on the record. However, when the sampling period is selected to start at 20 microseconds and is of 10 microseconds duration, the resulting record (Fig. 13D) is very closely similar to that obtained with a good continuous arc analysis (Fig. 13E). Furthermore such record (Fig. 13D) is reproducibly obtained and without the difficulties arising due to arc instability. When only a pure metal is being investigated, as illustrated in Figs. 13A–13D, arc instability is of minor consequence, but in the analysis of complex alloys, such instability of arc position and current gives rise to errors of measurement of concentration of constituent components. With the present invention applied to analysis of "pure" metals, alloys or any other material capable of spectrochemical analysis, there is obtained the sensitivity of arc analysis without the disadvantages of arc instability.

Furthermore, with the arrangement shown in Fig. 8, the potentials of the dynodes of the detector phototube 17A are not disturbed, so avoiding the switching of high potentials required in Fig. 5. There is thus attained with Fig. 8 greater reliability of operation and considerable reduction in the level of pick-up "noise" in the amplifier system.

In Fig. 8, the output dynode of tube 17A is directly coupled to a two-stage preamplifier 18A comprising, for example, a miniature dual triode tube 31A, 31B which together with its associated resistors 32—36 may be mounted directly below the phototube 17A. The first stage including triode 31A inverts the signal from phototube 17A and applies it through resistor 33 to the grid of the cathode-follower triode 31B. The output of the second stage including triode 31B is fed back by resistor 36 to the input of the first stage, providing 100% feedback. The overall voltage gain of amplifier 18A is slightly less than unity but a current gain of about 25 is obtained. This reduces the value of effective input capacity of amplifier 18A, allowing use of a larger input resistor 36 without loss of high-frequency response, thus allowing a greater input voltage to be developed from the photocell signal current. Direct or D. C. coupling is used throughout the preamplifier because of the input requirements of the time switch 21A interposed between the preamplifier 18A and the main amplifier 18B for gating in the location $G_4$ of Fig. 1.

Figure 9A:
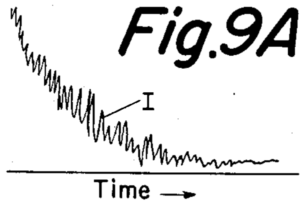

Fig. 9A (an ungated spark signal which in itself initiated the oscilloscope sweep) is a typical oscillograph record of the output I of preamplifier 18A taken with a sweep time of approximately 80 microseconds. It is a positive going D. C. pulse with "noise" fluctuations, inherent in the signal, closely corresponding wtih the fluctuations of the photo-electrons themselves. Bursts due to single photo (or thermal) electrons are evident. Observations made with a faster sweep show that the time constant of the preamplifier (for circuit values later herein given) is less than one microsecond.

The delayed pulse generator 26A (Fig. 8) which provides a positive voltage pulse PV during the "closed" time of switch 21A comprises two one-shot multivibrators 37A, 37B acting in series and each provided with means for selective adjustment of the duration of its output pulse. The first multivibrator 37A is triggered at the beginning of each sparking interval by radiation from the analytical gap. This radiation may be optical, in which case as in Fig. 5, a photocell is used as the pick-up device: preferably, however, and as shown in Fig. 8, the electrical radiation from the gap is used for triggering, in which case the pick-up device need simply be a short piece of wire or antenna 38 disposed adjacent the gap electrodes 11, 11 and connected to the grid of multivibrator triode 39A. The trailing edge of the output pulse $M_1$ of the first multivibrator 37A triggers the second multivibrator 37B which responds only to negative-going pulses. Such negative pulses $M_2$ are produced by differentiation of pulses $M_1$ by an RC network including capacitor 40 and resistor 41. The output pulse PV of the second multivibrator 37B controls the time switch 21A.

The length of pulses $M_1$ determines the delay between initiation of a sparking interval and initiation, within that interval, of the period of responsivenes of the amplifier portion of the spectrograph system. The length of pulse PV determines the "closed" time of switch 21A and therefore the length of the response period of the amplifier within each sparking interval. For adjustment of the aforesaid delay in closure of switch 21A, the first multivibrator is provided with variable resistor 60 and a capacitor 43 adjustable in steps by switch 44. For adjustment of the "on" period of switch 21A, the second multivibrator 37B includes capacitor 68 and associated variable resistor 41.

The positive input signal I of the electronic time switch 21A is, except for phase, the photomultiplier signal itself. The positive output signal of switch 21A reproduces the input signal only during the period corresponding with the "closed" or "on" time of the switch: for the remainder of each sparking interval, the positive output signal is essentially zero—not more than about $1/10{,}000$ of the input signal. The input signal to switch 21A is first applied to the cathode-follower stage 45 including triode 46 which effectively isolates the preamplifier 18A from loading effects of subsequent stages.

The cathode circuit of tube 46 includes, instead of the conventional single cathode resistor, the two cathode resistors 47, 48 with a diode 49 between them. This diode passes current only when the potential of point 50 is positive with respect to ground and this potential determines whether switch 21A is closed or open. The output signal $I_0$ of the switch is the voltage-drop produced across resistor 48.

A second diode 51, connected through resistor 52 to a source of negative potential, serves as a by-pass for the quiescent direct current as well as a large part of the undesired part of the cathode-follower current. This negative potential is sufficiently great to insure that point 50 remains negative for the greatest input signal to the cathode follower (maximum input signal corresponds with saturation of the preamplifier 18A). For the latter purpose, the second diode 51 is not necessary; but in order that the switch can be closed, it is necessary that this bypass current be effectively removed. This is effected by applying the reproduced delayed pulse signal PV through capacitor 75 to the second diode 51 which effectively blocks the by-pass current for the duration of pulse PV. The cathode-follower current therefore flows through output resistor 48 for the response interval and is a faithful reproduction of the spectral input signal during the response interval.

Figure 9B:
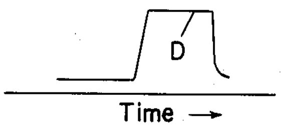

Even with no input signal (negligible radiation at the wavelength passed by exit slit 16), the quiescent tube current will flow during this interval and has an output wave-form such as shown in Fig. 9B. This puts the operating point in a region of good conduction of diode 49 so that the large current variations are obtained for small voltage changes on that diode.

For circuit simplicity, the diodes 49, 51 are preferably crystal diodes. However, most crystal diodes have some reverse conduction and it was found that the large negative by-pass currents required could make point 50 so negative that undesirable reverse or back currents would flow. Such back currents are eliminated by a third crystal diode 54 connected between point 50 and ground, to clip any excessively negative pulse potentials at point 50.

Figure 9C:
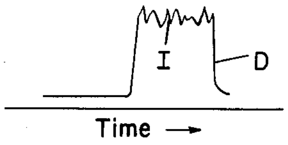
Figure 9D:
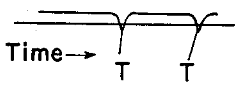
Figure 9E:
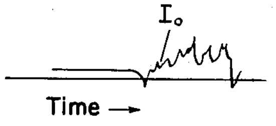

With the time switch 21A as thus far described, its output is a "pedestal" D(Fig. 9B) upon which the spectral information corresponding with the photoube signal I is superimposed (Fig. 9C). The pedestal or unwanted component is balanced out (Figs. 9D and 9E) by connecting the anode of a second triode 55 to the output resistor 48 which has a contact **48*a* adjustable for such balancing. The switching pulses PV are applied to the grid of triode 55 which therefore produces a pulse equal to the closed time of the switch and of opposite polarity to the pedestal pulses across resistor 48. Consequently, except for some transients T, T which are of no consequence to the recorder, the null-signal pedestal D of Fig. 9B may be exactly balanced out as shown in Fig. 9D. Thus, as shown in Fig. 9E, the output signal of the switch is a reproduction of the output of the photomultiplier tube 17A** and lacks the pedestal of Fig. 9C.

In a particular arrangement used, the preamplifier 18A had a 0–2,000,000 cycle band-pass.

As exemplary of suitable constants for components of the system of Fig. 8, the following tabulation is given:

*Preamplifier*

| | | Ohms |
|---|---|---|
| 32 | | 100,000 |
| 33 | | 100,000 |
| 34 | | 750,000 |
| 35 | | 2,000 |
| 36 | | 50,000 |
| Tubes: | | |
| 31A, 31B | | 12AX7 |

*Delayed pulse generator*

| | | |
|---|---|---|
| 56 | ohms | 15,000 |
| 57 | do | 65,000 |
| 58 | do | 84,000 |
| 59 | do | 150,000 |
| 60 | ohms max | 500,000 |
| 43A | mmfd | 15 |
| 43B | mmfd | 50 |
| 43C | mmfd | 125 |
| 61 | mmfd | 15 |
| 40 | mmfd | 15 |
| 62 | ohms | 4,700 |
| 63 | do | 10,000 |
| 64 | do | 4,700 |
| 65 | do | 65,000 |
| 66 | do | 85,000 |
| 67 | do | 180,000 |
| 41 | ohms max | 500,000 |
| 68 | mmfd | 30 |
| 69 | mmfd | 15 |
| 70 | mfd | 1 |
| Tubes: | | |
| 39A, 39B, 88A, 88B | | 12AU7 |

*Time switch*

| | | |
|---|---|---|
| 47 | ohms | 1,500 |
| 48 | do | 4,000 |
| 52 | do | 8,000 |

| | | |
|---|---|---|
| 71 | ohms | 22,000 |
| 72 | do | 1,500,000 |
| 73 | do | 150,000 |
| 74 | do | 100,000 |
| 75 | mfd | 1 |
| 76 | mfd | 0.01 |
| Tubes: | | |
| 46, 55 | | 12AX7 |
| Rectifier: | | |
| 49 | | IN34 |
| 51 | | IN34 |
| 54 | | IN34 |

In spectrochemical analysis, the desired result is a map of spectral intensities as a function of time or of wavelength. This may be done by adjusting the spectroscope so that radiation at a selected narrow region of the spectrum is applied to phototube 17A and slowly varying the selected time interval in synchronism with movement of the recorder chart so that the resulting trace is of spectral intensity with respect to time in the sparking interval. This may be done for arc lines, spark lines, continuous background or whatever part of the complex radiation spectrum is of interest for the particular analysis. For weak lines, the results are significantly different from those obtainable from an oscillograph because if more than a few oscillograph traces are superimposed, the composite picture becomes most confused. With the electronic gating, the recorder may accumulate data over a period of several seconds per line if necessary, and since several hundred spark discharges per second are readily obtainable, it is here feasible to make quantitative measurements of lines which are of the order of 1,000 times weaker than those useful with oscillographic techniques.

Another method of obtaining the desired mapping is to fix the time period of recording within the sparking interval and to scan the spectrum. The background corrections that must usually be made are more easily obtained by this method, but re-plotting is necessary if it is desired to know the time variations. Fig. 10, for example, shows typical data obtained in this manner for a steel containing some chromium. The discharge current waveform S is sketched in the lower left on the same time scale: the symbols along the time axis represent the time intervals used for data taken in two spectrographic regions to measure suitable arc lines (crosses) and spark lines (circles) of iron and chromium.

In Fig. 10, the persistence of arc lines long after the spark discharge has been completed is very evident. The continuous background is different in the two regions, that near 2863 A. rather closely following the Fe II line in contour. In both cases, the intensity of the background relative to the arc lines is much weaker in the latter part of the sparking interval. The record shows a curious feature in the behavior of the Cr I line: near the beginning of the sparking interval, it is four times weaker than the Fe I line but increases relative thereto rapidly becoming stronger than the Fe I line at about 50 microseconds and thereafter continuing in a fairly constant ratio.

Fig. 11 also represents data on chromium behavior obtained with the system of Fig. 8. For constructing the three working curves 11A, 11B, 11C, different electrode pins containing various amounts of chromium determined by other methods were used. Curve 11C was plotted from data obtained with a response interval of 5 microseconds duration (beginning 5 microseconds after intiation of each sparking interval); curve 11B was plotted from the response for the whole sparking interval; and curve 11A was plotted from the response for the period 32 to 38 microseconds of the sparking interval. In this figure, the continuous background correction has not been made and is represented by the vertical intercept of each curve with the intensity axis. Curve 11A has obvious analytical advantages since the background intensity is very low: moreover, curve 11A has a long linear region and a much greater slope, affording higher sensitivity.

The systems of Figs. 5 and 8 are generically similar in that they provide for suppression of response in selected periods of the sparking cycle, but the system of Fig. 8 has the advantage that short periods of response anywhere in the sparking period are resolvable (Figs. 2E, 2F) and that the switching noise of the system of Fig. 5 is eliminated. In Fig. 8, the lower limit is determined by the photo-electron fluctuations. With both arrangements, since the system may be insensitive for a large part of the cycle, the usual low-level difficulties with dark current fluctuations of the phototube are much reduced and may be almost completely eliminated with the Fig. 8 arrangement. As exemplary of this advantage, reference is made to Figs. 14A and 14B. In both figures, the photocell is insensitive for the record of wavelength intervals $X_1$, $X_2$; for the wavelength intervals $Y_1$, $Y_2$, the photocell is sensitive but no light from the specimen is received by it: for the wavelength interval Z, the spectrum is being recorded. Without the electronic shutter (Fig. 14A), the dark-current noise of the photocell is markedly evident in the record (Fig. 14A), whereas with electronic gating to activate the spectograph for the 3–13 microsecond period of the sparking interval, the dark-current noise of the phototube is barely perceptible (Fig. 14B). Consequently, the sensitivity of the amplifier-recorder may be increased to record lines of still lower intensities which otherwise would be obscured or obliterated by dark-current noise.

The arrangement shown in Fig. 15 is generally similar to that of Fig. 8 and corresponding elements are identified by the same reference characters with addition or change of suffix when modified. As in Fig. 8, the specimen is periodically excited by a spark discharge and radiation from the analysis gap 11, 11 is used to trigger a delayed pulse generator 26B which provides a gating signal, determining at what time and for how long in the sparking interval an electronic switch 21B in the signal channel between phototube 17A and recorder 19 is closed. As in Fig. 8, the delayed pulse generator is provided with adjustable circuit elements for preselection of the time of initiation of the sampling interval and of the duration of the interval. In this modification (Fig 15), perhaps the most significant changes are the omission of tubes from the electronic time switch and some circuit modifications of the preamplifier.

The output current of the photomultiplier tube 17A produces a voltage across load resistor 36 which causes the grid of preamplifier tube 31A to go more negative. This voltage is inverted and amplified by tube 31A: by way of example, the signal may be amplified 50 times. The amplified signal is impressed upon the voltage divider comprising resistors 33, 34 for application of a selected fraction, for example, ⅚ of the amplified signal to the grid of second stage tube 31B which is connected as a cathode follower. In the given example, the output voltage of the preamplifier appearing at terminal or point 77 is positive and about 38 times the negative input signal of the preamplifier. However, point 77 is connected to provide 100% reverse or negative feedback to the grid of the first stage tube 31A of the preamplifier. Hence, the voltage swing of this grid is only 1/39 that of the load resistor 36 itself with the result that capacitive loading of the phototube output by the phototube capacities and exernal capacities including that of leads is very materially reduced with corresponding extension or enhancement of the higher frequency response of the phototube-preamplifier combination.

Although the preamplifier 18C provides no voltage amplification of the phototube output, the aforesaid reduction in the effective input capacitance permits use of a higher value of load resistor 36 than would otherwise be consistent with the requirements for satisfactory high-frequency response. Furthermore, the preamplifier provides a better match between the high-impedance of the photomultipliers and the lower impedance of the crystal diodes of the time-switch 21B later described.

The output of preamplifier 18C is required to be a D. C. signal which at all times provides a well-defined reference voltage for the electronic switch 21B. Even with no input signal to the preamplifier, it has a steady output which in this example is adjusted to provide for flow of 0.1 milliampere through switch 21B when it is closed. The output of preamplifier 18C is single-ended and grounded. In order that the grid of tube 31B shall not be biased positive, its coupling network (resistors 33, 34) is connected to the negative terminal of a D. C. source 91 supplying 580 volts in this example. This supply and the high-valued resistor 78 are used to regulate the bias of the grid of first-stage tube 31A.

Suitable values for the resistors 33, 34, 35, 36 and 78 of the preamplifier are respectively 100, 500, 5, 50 and 14,000 kilo-ohms.

The electronic switch 21B comprises four crystal diodes 49, 54, 79 and 80 (preferably 1N34 germanium diodes) whose circuit connections are clearly shown in Fig. 15 and whose functions will be clear from the following discussion of the switch operation.

With point 50 positive with respect to ground, the switch 21B is closed, the output signal current from the preamplifier passing through diode 49 (in the direction of its arrow) to the recorder-amplifier 18B: with point 50 negative with respect to ground, the poling of diode 49 is such that it blocks passage of the signal to amplifier 18B. Thus, switch 21B can be opened or closed by controlling the voltage at point 50. To keep switch 21B open, the point 50 is connected to a suitable source 92 of negative potential through diode 79 and resistors 81, 82: the current through this path is made great enough so that the maximum possible current from the preamplifier 18C (its saturation value) cannot make point 50 positive with respect to ground.

Because present crystal diodes are not perfect asymmetric conductors, some reverse currents will pass through diode 49 when point 50 is negative. The diode 54 connected between point 50 and ground is poled to provide a clipping action to the otherwise high negative voltage: this action insures that the undesirable reverse currents shall be low. Moreover, the low dynamic resistance of diode 54 minimizes the modulation of the voltage at point 50 by the positive-going signals at 77 when the switch 21B is open: the forward resistance of diode 54 is low compared to the value of resistor 83 connected between points 77 and 50.

To close switch 21B, the connection from point 50 to its source 92 of negative potential must be effectively broken. This is done by application to the point 84 of a positive switching pulse PV whose amplitude is sufficiently great to insure that the potential at point 84 is more positive than the maximum positive potential at point 50 (preamplifier saturated). Thus, during application of pulse PV, the diode 79 passes no current and the negative potential which held switch 21B open is effectively removed, whereupon the potential of point 50 becomes positive and assumes a voltage proportional to that of output terminal 77 of the preamplifier. For zero input signal to the preamplifier, the voltage of point 50 is determined by the quiescent current through preamplifier tube 31B. As above stated, this voltage is so adjusted that for the 1N34 diode used, about 0.1 milliampere passes through the diode 49 to the recorder amplifier. Thus, the switch 21B is closed and the operating point of diode 49 is located in the linear region of its characteristic to insure constant proportionality between the preamplifier input and the switch output.

As thus far described, the arrangement of Fig. 15 provides a switch output in which the light signal I is superimposed upon the quiescent signal or pedestal D. (Fig. 9C). To eliminate this pedestal from the record so that the recorder reads zero for zero light signal to phototube 17A, there is applied, beyond the diode 49, an inverted or negative pulse VP of the same shape as switching pulse PV and coexistent in time.

The pedestal-cancelling pulse VP may be derived from the output circuit of tube 88A of the pulse generator 26B. Capacitor 85 and diode 80 serve as a D. C. restorer for the pulse which is then fed into the input system of amplifier 18B by resistor 86 and potentiometer 87. The latter is adjusted to set the reading of recorder 19 exactly on zero for zero light input to the phototube 17A.

In this modification, both the delayed switching pulses PV and the pedestal-neutralizing pulses VP are produced by the switching generator. Specifically, the cathode of the tube 88A of the second multivibrator section 37B of the pulse generator 26B is connected to point 84 above discussed and a suitable point 89 in the anode circuit of the same tube is connected to capacitor 85. Thus, when tube 88A is triggered "on," the positive-going pulse PV appearing at the cathode is effective to turn "on" switch 21B and the negative-going pulse VP appearing in the anode circuit is applied to the switch 21B beyond the diode 49 to cancel the pedestal D, with the result the output switch signal consists only of light-signal variations (Fig. 9E).

Automatically to record the intensity (or relative intensity) of a spectral line as a function of time in the sparking interval, the pulse generator 26B is provided with an adjustable resistor 90 whose movable element is mechanically coupled to or driven in synchronism with the chart drive of recorder 19. Thus, with switch 91 in its "A" position, the time of initiation in the sparking interval of the switching pulse PV is progressively changed. The resulting record may be a single continuous trace similar to that of each of the curves of Fig. 10 or may be a series of traces such as shown in Fig. 16. In the latter case, the gain of amplifier 18B is increased in steps by known amounts so that low intensities for later portions of the sparking interval are substantially amplified to facilitate reading of the record.

What is claimed is:

1. In a spectrograph system in which a specimen of material to be analyzed is periodically excited by successive spark discharges to emit radiation applied through a spectrograph to a radiation-sensitive detector for production of a spectrographic record, a method of operation which comprises periodically sensitizing the system for successive periods each corresponding with only a selected portion of the total time interval between initiation of the successive spark discharges, and producing by an integrated function of the successive responses of the detector for the aforesaid sensitive periods of the system a spectrographic record which is characterized by suppression of air and background lines and by selective recording of spark or arc lines of the specimen material.

2. A method as in claim 1 in which at least a narrow spectral region of the total radiation is scanned and in which the scanning rate is low relative to the repetition rate of sensitization of the system to insure continuity of an intensity/wavelength record for said spectral region.

3. A method as in claim 1 in which the radiation applied through the spectrograph to the detector is of the same wavelength throughout production of a record and in which the selected portion of the time interval between initiation of successive spark discharges is progressively shifted as a function of time to provide an intensity/time record of the radiation of said wavelength.

4. A method as in claim 1 in which the selected portion of the time interval begins a few microseconds after initiation of each spark discharge, at which time the spark current has fallen to negligible value, so to obtain both the sensitivity of arc analysis and the reproducibility of spark analysis.

5. A method of spectrographically analyzing a specimen material which comprises periodically exciting said material by successive spark discharges periodically to produce emission of radiation including air lines, background lines, spark lines and arc lines, selecting a portion of the total time interval between successive spark discharges during which the radiation from air lines and background lines is of insubstantial magnitude, and effecting by integration of the radiation emitted during the successive selected portions of the total time intervals a spectrographic record which is characterized by suppression of air and background lines and by selective recording of spark or arc lines of the specimen material.

6. A spectrograph system comprising a periodically excited spark source, a spectrograph receiving radiation from said source and including wavelength-selective means, converter means effective upon application thereto of gating pulses to convert the selected radiation output of said spectrograph to an electric signal, said converter means including a photo-sensitive device and an amplifier, and gating pulse means operating in synchronism with excitation of said source periodically to sensitize said converter means for a selected period in each of the intervals between successive excitations of said spark source, said gating pulse means including means for varying the time of initiation and duration of the gating pulses.

7. A spectrograph system as in claim 6 in which the sensitizing means is synchronized by a pick-up device responsive to radiation from the spark source.

8. A spectrograph system as in claim 7 in which the pick-up device is responsive to electric radiation from the spark source.

9. A spectrograph system as in claim 7 in which the pick-up device is a second photo-sensitive device responsive to optical radiation from said source for synchronization of said sensitizing means.

10. A spectrograph system as in claim 6 including circuitry for applying the gating pulses to control an operating potential of the photo-sensitive device.

11. A spectrograph system as in claim 6 including circuitry for applying the gating pulses to control an eelctronic switch included in the converter means.

12. A spectrograph system as in claim 6 including circuitry for applying the gating pulses to control an electronic switch interposed in circuit between said photo-sensitive device and said amplifier.

13. A spectrograph system comprising a periodically excited spark source, a spectrograph receiving radiation from said source and including wavelength selective means, a photo-electric amplifier system effective upon application thereto of gating pulses to convert radiation selectively passed by said spectrograph to an electric signal of corresponding amplitude, a generator for producing said gating pulses, and means responsive to radiation from said spark source to initiate a cycle of said generator whereby the signal is produced during a selected part of each interval between initiation of successive sparks.

14. A spectrograph system as in claim 13 in which the generator is a one-shot multivibrator and in which is included an electronic switch in circuit with a photoelectric device of said amplifier system for control by the output pulses of the multivibrator.

15. A spectrograph system as in claim 14 in which the radiation-responsive means is a second photoelectric device whose output triggers the one-shot multivibrator in response to each excitation of the spark source.

16. A spectrograph system as in claim 13 in which the generator comprises two one-shot multivibrators, the first of which is triggered by said radiation-responsive means to trigger the second at a predetermined time after each excitation of the spark source, and in which is included an electronic switch controlled by the output of the second multivibrator to sensitize the amplifier system for a predetermined period in the interval between successive excitations of the spark source.

17. A spectrograph system as in claim 16 in which the electronic switch is interposed between intermediate stages of the amplifier system.

18. A spectrograph system as in claim 16 in which the electronic switch comprises rectifier means interposed between a pre-amplifier for the photoelectric device of said amplifier system and a subsequent amplifier stage.

19. A spectrograph system as in claim 13 in which the last-named means includes an antenna in the field of electric radiation from the spark source.

20. A spectrograph system as in claim 13 in which the last-named means includes a photo-sensitive device responsive to optical radiation from said spark source.

21. A direct-reading spectrograph system comprising a periodically excited spark source, means for recording the intensity of radiation from said source at selected wavelengths including a spectrograph and a detector-amplifier arrangement producing for said recording means a signal corresponding with the intensity of the selected radiation, an electronic switch for gating said detector-amplifier arrangement, and a pulse generator synchronized with said spark source providing for said switch gating pulses determining the period of responsiveness of said detector-amplifier arrangement in each of the intervals between successive excitations of said spark source.

22. A direct-reading spectrograph as in claim 21 in which the pulse generator includes impedance means adjustable both to select the time of initiation and the duration of the period of responsiveness of the detector-amplifier arrangement.

References Cited in the file of this patent

UNITED STATES PATENTS

| | | |
|---|---|---|
| 2,351,457 | Rust et al. | June 13, 1944 |
| 2,577,814 | Sunderson et al. | Dec. 11, 1951 |

OTHER REFERENCES

"Spectrograph Exposure Control"; (Cosby) Electronics, vol. 19, April 1946, pages 123 through 125.